No. 690,741. Patented Jan. 7, 1902.
M. KORTH.
MACHINE FOR MAKING ROLLS, CAKES, OR THE LIKE.
(Application filed Feb. 11, 1901.)
(No Model.) 4 Sheets—Sheet 1.

Witnesses:
James R. Mansfield
J. Stewart Rice

Inventor:
Martin Korth
By:
Alexander & Towell
Attorneys

No. 690,741. Patented Jan. 7, 1902.
M. KORTH.
MACHINE FOR MAKING ROLLS, CAKES, OR THE LIKE.
(Application filed Feb. 11, 1901.)

(No Model.) 4 Sheets—Sheet 2.

No. 690,741. Patented Jan. 7, 1902.
M. KORTH.
MACHINE FOR MAKING ROLLS, CAKES, OR THE LIKE.
(Application filed Feb. 11, 1901.)
(No Model.) 4 Sheets—Sheet 3.

Witnesses:
James R Mansfield
J. Stewart Rice

Inventor:
Martin Korth
By:
Alexander & Dowell
Attorneys

No. 690,741. Patented Jan. 7, 1902.
M. KORTH.
MACHINE FOR MAKING ROLLS, CAKES, OR THE LIKE.
(Application filed Feb. 11, 1901.)
(No Model.) 4 Sheets—Sheet 4.
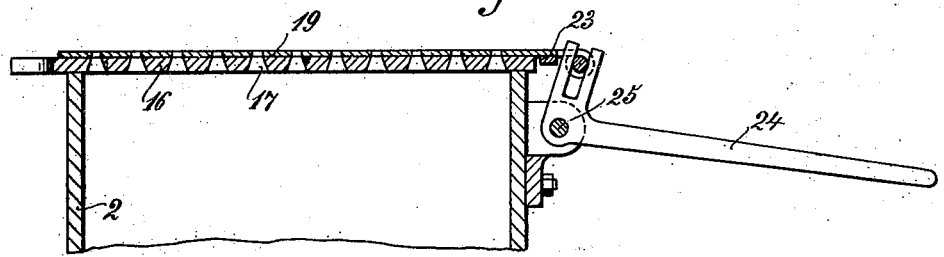
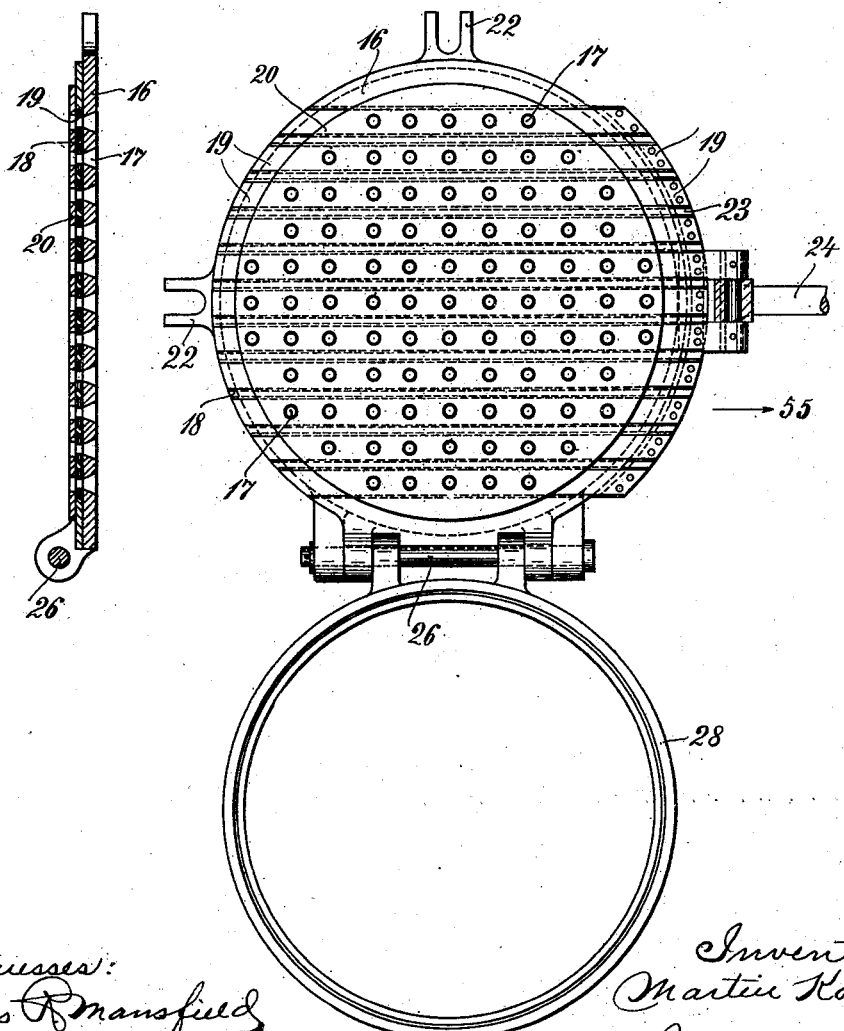

UNITED STATES PATENT OFFICE.

MARTIN KORTH, OF COLOGNE, GERMANY.

MACHINE FOR MAKING ROLLS, CAKES, OR THE LIKE.

SPECIFICATION forming part of Letters Patent No. 690,741, dated January 7, 1902.

Application filed February 11, 1901. Serial No. 46,892. (No model.)

*To all whom it may concern:*

Be it known that I, MARTIN KORTH, a subject of the King of Prussia, Emperor of Germany, residing at Cologne-on-the-Rhine, in the Kingdom of Prussia and German Empire, have invented certain new and useful Improvements in Machines for Making Rolls, Cakes, or the Like, of which the following is a specification.
My present invention relates to machines for forming rolls, cakes, &c., from previously-prepared dough.

The machine consists, essentially, of a cylinder containing a piston provided with air-tight packing, which is operated by mechanism outside the cylinder. Above the piston the dough is contained in the cylinder. A plate closes the top end of the cylinder, being provided, however, with a number of perforations corresponding in shape to the form of the rolls, &c., to be made, but of smaller size. Above the plate closing the top of the cylinder is provided a cover or end piece provided with means for strewing flour on the dough forced through the perforations in the end plate and for exercising a yielding pressure on said dough. In addition to the above-mentioned parts a cutting device operated by hand is also provided, and in order to call the attention of the operator when the dough is ready to be cut is arranged, in combination with the means mentioned above for exercising the yielding pressure, a special call device.

The machine is designed to enable the production of rolls, cakes, &c., in large quantities without having to previously weigh the dough, to divide it by a dividing-machine, or by hand.

A second object of the invention is to enable the dough to be worked without loss of the fermenting gases, so that the rolls, &c., to be formed can be soon subjected to the baking process.

Figure 1:
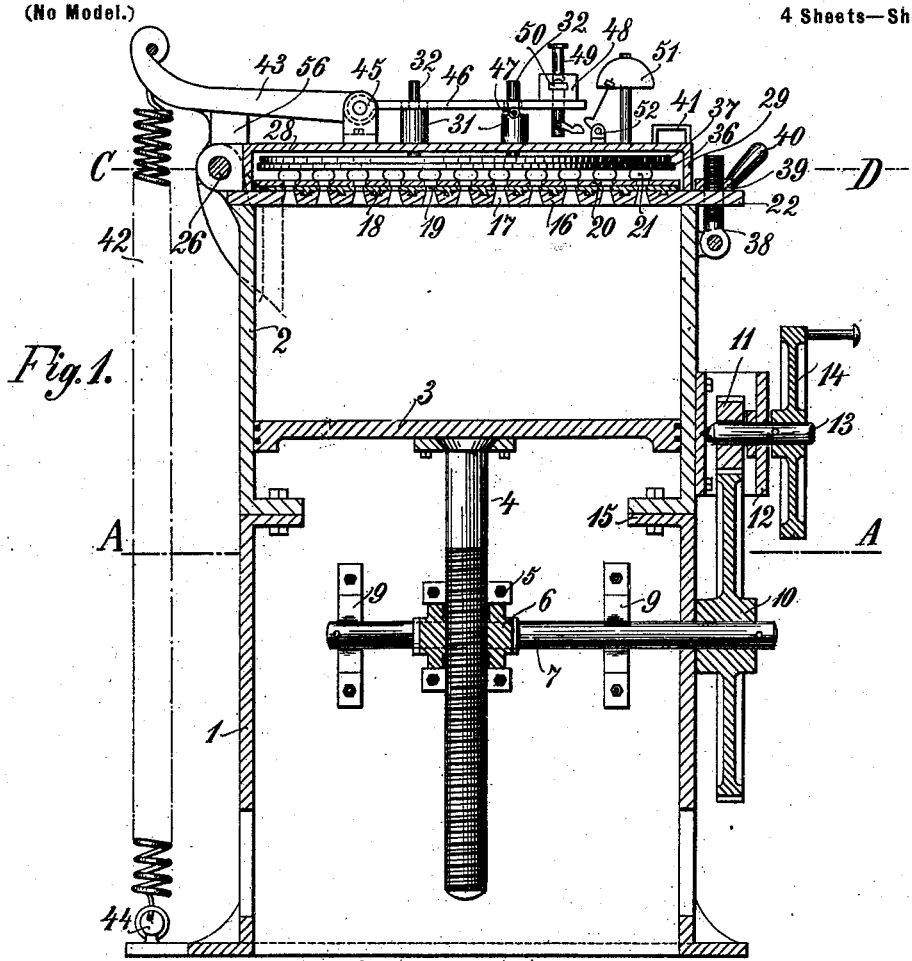
Figure 2:
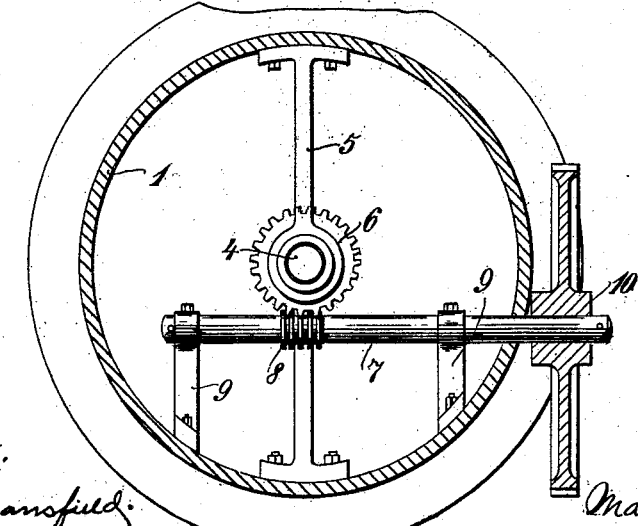
Figure 3:
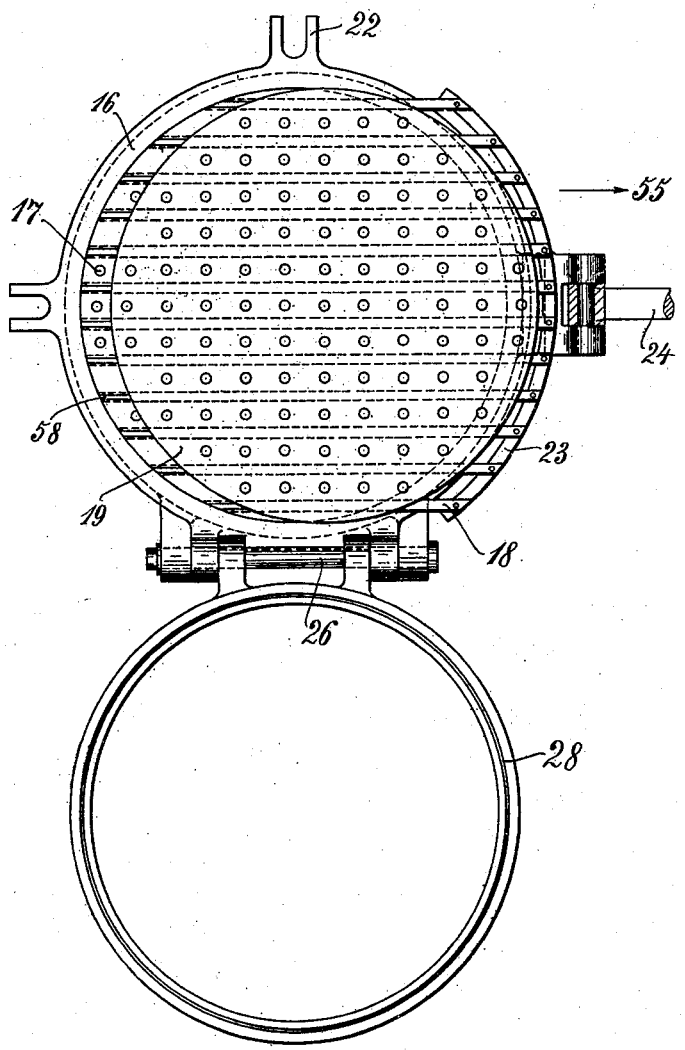
Figure 4:
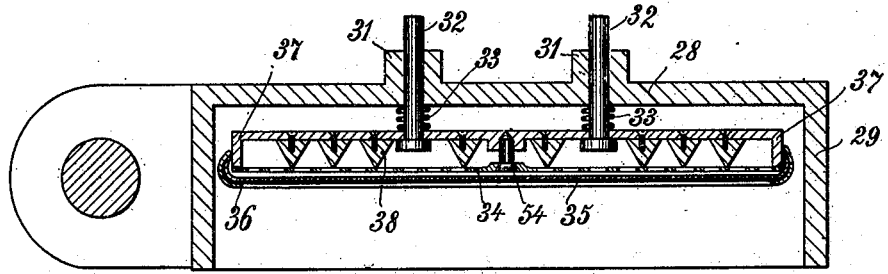
Figure 5:
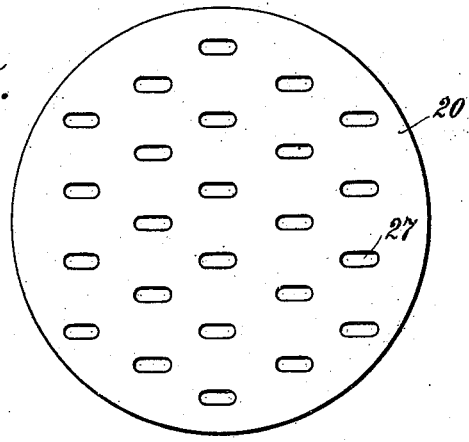
Figure 9:
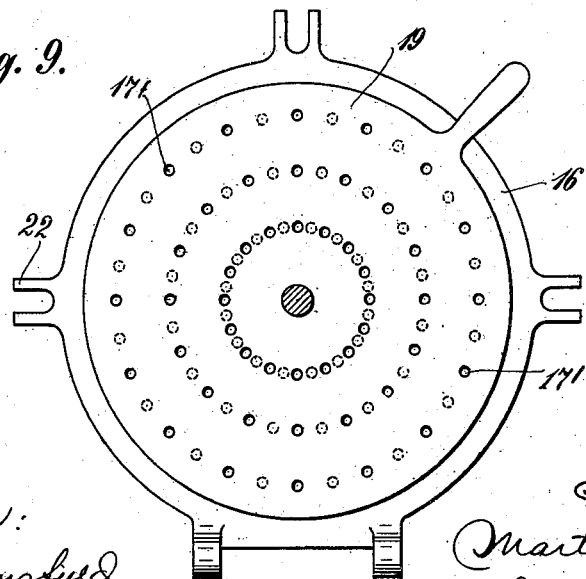

In the accompanying drawings, illustrating my invention, Figure 1 is a longitudinal section of the machine; Fig. 2, a section on the line A A of Fig. 1; Fig. 3, a cross-section on the line C D of Fig. 1, being a plan view of the rotary plate closing the end of the cylinder and of the slides combined therewith. Fig. 4 represents a cross-section through the cover or end piece of the cylinder. Fig. 5 shows a detail hereinafter described. Fig. 6 is a sectional view showing the means for operating cutter 19. Figs. 7 and 8 show a modification of the cutting devices, and Fig. 9 shows a third modification.

The cylinder 2 is secured to the under cylinder 1 by means of the flanges 15. The lower cylinder 1 is designed principally for the reception of the driving mechanism of the piston 3, situated in the cylinder 2. On the piston 3, which is provided with an air-tight packing, rests the dough (not shown) to be shaped. At the top of the cylinder 2 is arranged the plate 16, which is provided with any desired number of perforations 17. The plate 16 is hinged on the bolt 26. The perforation 17 can have any desired form, depending on the form of the articles to be produced. In Fig. 3 these perforations are shown round or circular, while in Fig. 5 an extended form is represented.

The perforations 17 do not correspond in size with the rolls or other articles to be made, but are somewhat smaller. They are, however, conical, the outlet ends being smaller in cross-section than the inlet ends. These perforations can, of course, also be cylindrical in form—that is to say, parallel; but practice has shown that with a conical form the dough is subject to less friction, and the machine can therefore be driven with less power. The slide 19 is arranged above the end plate 16 of the cylinder and can be reciprocated backward and forward with dovetailed plates 18, provided in corresponding grooves 58 in the plate 16, Fig. 3, by means of a lever 24, fulcrumed on the bolt 25, attached to cylinder 2. The plate 19 must, of course, also be provided with perforations corresponding to those in the plate 16; but the edges of said perforations are sharpened, so that by moving the plates 16 and 17 relative to each other the dough can afterward be cut.

Instead of arranging the plates 18 to slide in the grooves 58 they can be screwed to the plate 16, and instead of the plate 19 steel strips perforated and guided between the plates 18 can be connected to the ring 23, as shown in Figs. 7 and 8. Further, the plate 16 could be provided with a disk 171, secured by a screw in the middle, so that by moving these plates relative to each other the size of the perforations can be regulated. (See Fig. 9.)

Above the slide above described, which forms the cutting device, is arranged a loose plate 20, also provided with perforations corresponding in position to those in the plate 16, but of larger size. This loose plate 20 is designed to carry all the rolls or other articles formed, so that by lifting the plate all of such articles can be removed.

On the cylinder 2 a cover 28, hinged at 26, is provided. A ring or projection 29 on this cover rests upon the plate 16, and the cover is so constructed as to combine the strewing apparatus with an arrangement for providing the necessary yielding pressure on the dough issuing through the perforations in the plate 16. For this purpose the cover 28 is provided with projections 31, in which bolts 32 are arranged, carrying a receptacle 37, situated in the interior of the cover and closed at the bottom by a plate 34, provided with a number of perforations. Inside the receptacle 37 the ridge-pieces 38 are provided, Fig. 4, being screwed to the top plate of the receptacle or made in one piece with the same. The receptacle 37 is designed to contain the strewing flour or the like, and the object of the ridges 38 is to prevent the flour from falling to one side on turning the cover about the hinge 26. For the sake of economy a cloth 35 of loose texture is stretched over the perforated plate 34, being fastened by a suitable ring 36. It will be seen that on turning down the cover 28 the loose plate 20 will be uniformly covered with flour, and the rolls or other articles to be formed bearing against the cloth 35 it is impossible for the dough to become fixed to any part.

Instead of the strewing apparatus just described a cloth passed through flour can be placed on the loose plate 20, so that upon the dough issuing through the perforations in the plate 16 the said cloth will be pressed against the apparatus provided to exercise the yielding pressure on the dough.

Between the receptacle 37 and the cover 28 springs 33, coiled around the bolts 32, press the lower plate of the receptacle against the dough issuing through the holes in the plate 16, thus exercising the yielding pressure required.

The regulation of the issuance of the dough through the perforations in the plate 16 is also effected by this device, inasmuch as it prevents more dough issuing through one perforation than through another.

It should be remarked that the openings in the loose plate 20 must be larger than the perforations in the plate 16, because the dough in such openings would become fixed after the pressing action has been inserted on the dough and the pieces have been cut.

When the rolls or other articles are finished, they have the form represented in Fig. 1 at 21. The pressing apparatus has at this stage been raised, and consequently the bolts 32 also. These bolts 32 act upon a lever 46 through the agency of a roller 47, supported in a bridge-piece. Two adjacent bolts 32 are connected together by means of such a bridge-piece. The front end of the lever 46, which is supported in bearings in the part 45, has a projection 48, which acts as a weight at the same time. In this projection 48 moves a bolt 49, which is provided with a scale and is adjustable by means of the thumb-screw 50. At the lower end of the bolt 49 is provided a foot 53, which in the position illustrated in Fig. 1 allows of an upward turning movement, but not of a downward one. The foot 53 actuates a hammer that strikes against the bell 51, being formed into a spring at one end wound around a bolt. The foot 53 actuates the hammer and accordingly causes the bell to ring in consequence of the upward movement of the pressing device, showing that the time has arrived for cutting off the shaped rolls or other articles and for removing the same from the machine.

According to the height at which the bolts 49 are adjusted the bell is rung at greater or less intervals, the pressing device occupies more or less time in pressing the dough, and consequently different sizes of articles are obtained.

In the part 45 is fulcrumed a lever 43, which rests upon a projection 56 of the cover 28 and is connected by means of a spring 42 and ring 44 to the base of the machine. The object of this device is to facilitate the opening or turning of the cover 28.

The cover 28 remains closed over the plate 16 by reason of its own weight, but can of course be provided with a suitable fastening.

Owing to the arrangement of the projection 56 on the cover 28, the cover bears on the plate 16 when opened and remains at an obtuse angle. It should be remarked that in filling the cylinder 2 with dough the cover 28 serves as a counterweight for the hinged plate 16.

The plate 16 can be secured to the cylinder when closed by any suitable means. In Fig. 3 eyes are provided on the plate 16, corresponding with bolts 38, turning on bolts secured to the cylinder 2. The bolts 38 are turned up and secured in the eyes by means of a nut with handle 40.

The machine is driven in any suitable manner by means of gearing. For the purpose of driving the piston-rod 4 is provided a spur-wheel 6, fixed in the bearing 5. In the spur-wheel engages a worm 8 on a spindle 7, which rests in the bearing 9 and carries outside of the cylinder the spur-wheel 10. The latter meshes with a pinion 11 on the spindle 13, arranged in a casing screwed to the cylinder, on the end of which is provided the fly-wheel 14.

Rolls and other similar articles made with this machine possess a similar character to those made by hand, the same effect being obtained by the fact that the dough-feed remains in the middle of the shapes formed, so that the exterior surface of such shapes is subject to tension. The same effect is obtained when a baker kneads a large piece of dough by hand, in doing which he kneads the same from the outside toward the lower middle and presses the same into the mass.

What I claim, and desire to secure by Letters Patent of the United States, is—

1. In a machine for making rolls, cakes and the like, a cylindrical vessel for the dough containing an air-tight piston forming a movable bottom of said vessel and driven by suitable means outside the cylinder, a plate closing the end of, and pivoted to said cylinder and provided with a number of perforations, a second plate likewise provided with perforations, corresponding to those in the first plate, and having sharpened or knife edges, a device arranged above said plates for strewing flour or the like on the dough forced through said perforations, said device being adapted to exercise a yielding and regulating pressure on the dough, substantially as set forth.

2. In a machine for making rolls, cakes, a cylindrical vessel for the dough containing an air-tight piston driven by suitable means outside the cylinder, a plate closing the end of, and pivoted to, said cylinder and provided with a number of perforations, a second plate likewise provided with perforations corresponding to those in the first plate and having sharpened or knife edges, a third, removable plate provided above the second plate and having perforations corresponding in position but larger in size than the perforations in the first plate, a device arranged above said plates for strewing flour or the like on the dough forced through said perforations, said device being adapted to exercise a yielding pressure on the dough, substantially as set forth.

3. In a machine of the kind described the combination of means for dividing the dough into portions of the size required for rolls or such like, a strewing device provided in the cover of the machine and means to exercise a yielding regulating-pressure on said dough portions, substantially as set forth.

4. In a machine of the kind described a cover consisting of a receptacle for the flour to be strewed, ridge-pieces on the inner side of the top plate of said receptacle, a perforated plate forming the bottom of said receptacle, and a cloth or fabric of loose texture stretched over said bottom plate, substantially as set forth.

5. In a machine for making rolls, cakes and the like a cylindrical vessel for the dough containing an air-tight piston forming a movable bottom of said vessel, a plate closing the end of said cylinder and provided with a number of perforations through which the dough is compressed by the said air-tight piston, means for cutting off the dough portions pressed through said perforations, a device arranged above said cutting means for strewing flour or the like on the dough forced through said perforations, said device being adapted to exercise a yielding and regulating pressure on the dough, substantially as set forth.

In testimony whereof I have hereunto set my hand in the presence of two witnesses.

MARTIN KORTH.

Witnesses:
CHARLES LE SIMPLE,
KARL SCHMITT.